Patented Apr. 4, 1944

2,345,980

UNITED STATES PATENT OFFICE 2,345,980

PRODUCTION OF TITANIUM PIGMENTS

John Lewis-Keats, Wilmington, Del., assignor to E. I. du Pont de Nemours & Company, Wilmington, Del., a corporation of Delaware No Drawing. Application September 22, 1939, Serial No. 296,069

7 Claims. (Cl. 23—202)

This invention relates to the preparation of pigment-quality titanium compounds and more particularly to the production of titanium oxide useful for pigment purposes. More specifically, it relates to novel methods for producing such pigment titanium oxide through hydrolysis of titaniferous solutions while maintaining the same under superatmospheric temperatures and pressures.

In a more restricted sense, the invention relates to a novel method for producing pigmentary titanium oxide by hydrolyzing titanium salt solutions under such conditions of temperature and pressure that the precipitate obtained from such hydrolysis comprises a substance having fully developed pigment properties and which requires no calcination treatment to develop essential and required pigment characteristics.

Various attempts have been made previously (e. g., U. S. Patents 1,402,256, 1,489,417, 2,118,916) to procure uncalcined titanium oxide which will possess satisfactory pigment characteristics. All such prior efforts, however, have failed to attain their object. In each instance the hydrolysis precipitate which is recovered must be subjected to calcination treatment and at relatively high temperatures in order to develop therein such essential pigment characteristics as desired particle size, color, oil absorption, opacity, tinting strength, etc. The tinting strength of products from such prior procedures is especially notably poor, and, unless subjected to calcination, said products are incapable of use as prime pigments.

It is among the objects of this invention to overcome these and other disadvantages which are afforded by products from prior processes, and to provide in particular a novel method for preparing a superior type of titanium oxide pigment possessing fully developed hiding power and other essential pigment properties without being subjected to calcination treatment. A further object is to provide a novel process for preparing superior titanium oxide pigments without resorting to calcination of such precipitate and through the medium of hydrolyzing titanium salt solutions at elevated temperatures and pressures.

These and other objects are attainable in this invention which embodies the discovery that the physical characteristics of hydrolyzed titanium compounds are greatly influenced by the conditions which prevail during hydrolysis; that, furthermore, improved, pigment-useful titanium compounds, particularly anhydrous titanium oxide, may be readily obtained by conducting such hydrolysis at certain elevated, critical temperatures and at the pressures corresponding to such elevated temperatures; and finally, that the hydrolysis precipitate from such procedure is, upon mere drying, and without recourse to calcination to develop pigmentary properties, adapted for direct use as a pigment.

In accordance with this invention, therefore, uncalcined, pigment-grade titanium compounds, and particularly anhydrous titanium oxide, are obtained by subjecting titaniferous aqueous solutions to hydrolysis under superatmospheric pressures and controlled, critical, elevated temperature conditions of the order of at least 225° C.

In a more specific and preferred embodiment, pigment quality, uncalcined, anhydrous titanium oxide, exhibiting excellent, fully developed tinting strength and other essential pigment characteristics, is obtained by subjecting an aqueous titanium salt solution, particularly a sulfate or chloride, to hydrolysis at temperatures ranging from substantially 350° C. to about 450° C. and at superatmospheric pressures corresponding to such temperatures.

In carrying out the invention, after preparing a titanium salt solution such as the chloride, sulfate, fluoride, nitrate, oxalate, etc., for hydrolysis in accordance with well-known procedures, said solution is introduced into a closed reaction zone or chamber, such as a suitable autoclave or bomb type of vessel, adapted to withstand relatively high temperatures and superatmospheric pressures. The solution is then hydrolyzed within such closed container, such hydrolysis being effected at a temperature of at least 225° C. and under the pressure generated by the solution at such temperature; or, if desired, at higher pressures. Preferably, and to obtain a product which exhibits satisfactory, optimum pigment properties, especially improved tinting strength, said hydrolysis is conducted at temperatures ranging from substantially 350° C. to about 450° C. and under pressures corresponding to such temperatures. The time of treatment which is required to effect substantially complete hydrolysis of the solution will vary and will depend upon the temperatures and pressures used, as well as the relative concentration of the solution being treated. Usually, such time period ranges from about 1 to 3 hours. Upon completion of hydrolysis, the hydrolysis precipitate is suitably recovered, which, upon being suitably washed and then dried at a temperature of approximately 100° C., will comprise a novel anhydrous product (not a basic sulfate), of fully developed pigment properties and which require no calcination treatment to develop such properties.

To a more complete understanding of the invention, the following examples are given, each being in illustration but not in limitation of the invention:

Example I

A solution of titanyl sulfate of the following composition:

|  | Grams |
|---|---|
| $TiO_2$ per liter | 197 |
| $H_2SO_4$ per liter | 466 |
| Fe per liter (in the form of sulfate) | 0.07 |
| Cr per liter (in the form of sulfate) | 0.02 | was prepared by dissolving $TiOSO_4.2H_2O$ which was crystallized from an impure titanium sulfate solution such as is obtained by attacking ilmenite with $H_2SO_4$. A volume of the above purified titanyl sulfate solution was placed in a tantalum tube and the tube placed in a closed bomb. The bomb was heated by means of an induction furnace to a temperature of 400° C. and held at that temperature for a period of one hour. When the tube was removed from the bomb after heating, it was found that the solution had completely hydrolyzed. The precipitate was washed to remove $H_2SO_4$ and traces of Fe and Cr originally present in the liquor and was dried at 100°. The dried product was found to consist of anhydrous $TiO_2$ without any combined water or $H_2SO_4$ such as is present in the dried products from hydrolysis at lower temperatures. The dried, uncalcined product was tested for tinting strength and color and was found to be superior in regard to these properties. The tinting strength was equal to that of the best anatase obtained by calcination procedures.

Example II

Titanium sulfate solution (350 cc.) obtained by attacking ilmenite with $H_2SO_4$ and having the following composition:

|  | Grams |
|---|---|
| $TiO_2$ per liter | 246 |
| Fe per liter | 36 |
| Total $H_2SO_4$ per liter | 600 | was diluted with water to give a concentration of 140 grams $TiO_2$ per liter, and the diluted solution placed in the tantalum tube as in Example I and heated at 360° for a period of three hours. The solution was completely hydrolyzed by this treatment giving a yield of approximately 100% of the theory. The precipitate after removal from the pressure tube was washed and dried at 100°. The dried product was characterized by tinting strength equal to that of products prepared by conventional calcination procedures.

Example III

The double salt, sodium titanium sulfate was prepared by adding sodium chloride crystals to a solution of titanium sulfate and heating the mixture as specified in U. S. 1,357,690. The double salt was washed to remove iron and the crystals dissolved in dilute $H_2SO_4$ to give a solution of the following composition:

|  | Grams |
|---|---|
| $TiO_2$ per liter | 50 |
| $H_2SO_4$ per liter | 312 |
| Fe per liter (in the form of sulfate) | 0.01 |
| Cr per liter (in the form of sulfate) | 0.01 |

The resulting solution was heated in a pressure tube or autoclave to a temperature of 360° and held at that temperature for one hour. The precipitate was washed and dried. It was characterized in the uncalcined state by tinting strength in the same range as pigments prepared by calcination procedures.

Example IV

Twenty-two cc. of anhydrous $TiCl_4$ was diluted with water to give a solution containing 27.5 grams $TiO_2$ per liter and 50 grams HCl per liter. This solution was heated to 360° in the autoclave used in previous examples and held at 360° for one hour. The solution was completely hydrolyzed at the end of the heating period. The precipitate was washed and dried. It was examined by the powder X-ray method to determine the crystalline modification and was shown to be rutile. The lines in the X-ray diffraction pattern were very sharp like the lines in the patterns of calcined pigments. The oven-dried product was also characterized by tinting strength in the same range as the best rutile pigments prepared by the calcination procedure.

Although the invention has been illustratively described in the foregoing examples as applicable to the hydrolysis of titanium sulfate and titanium chloride solutions, the same is not to be considered as limited to such illustrated applications. Other titanium salt solutions may be subjected to hydrolysis in accordance with the invention, examples of such other salt solutions of titanium including the nitrate, oxalate or fluoride.

Also, though the invention comprises heating an aqueous solution of a titanium salt in closed vessels at critical temperatures ranging from at least 225° C. to substantially 450° C., and preferably within the range of 350° C. to 450° C., under pressures corresponding to the temperature of the solution under treatment, it is to be understood that any higher pressure may be used, if desired, and without disadvantage so far as the process of this invention is concerned, provided only that the pressure imposed is within the safe limit for the equipment employed. In any given instance, the minimum pressure required will depend upon the temperature and composition of the solution used.

As already indicated, observance of certain critical temperatures must be had, in order to procure a product which possesses requisite tinting strength values to afford its direct use as a pigment without any calcination treatment. Should temperatures below 225° C. and, for instance, of the order of, say, 200 or 215° C., be used, development of desired, complete pigment strength will be found lacking, and hence the resulting product, being deficient in this essential alone, will be useless for employment in commercial pigment applications. On the other hand, when resort is had to temperatures of the order of at least 225° C., and especially within the range of 350 to 450° C., the recovered hydrolysis product will comprise a substantially completely developed pigment substance of relatively fine, uniform particle size, of dense, soft texture, and having tinting strength, color and oil absorption values substantially approximate to those exhibited by present commercial, calcined titanium oxide pigments. In such condition, the product will be eminently adapted for direct use as a pigment in all manners of application.

In adapting the invention, it will also be found that a product having requisite tinting strength and color is more effectually obtained when certain optimum ranges of acid concentration are employed during the pressure hydrolysis. Thus, when hydrolyzing titanium sulfate solutions at a temperature of, say, 360° C., a concentration ranging from about 3.1 to about 5.5 gram-mols $H_2SO_4$ per liter of solution will be most preferable for use; whereas, when hydrolyzing titanium chloride solutions at such temperature, a concentration of from about 1.0 to 4 gram-mols of HCl per liter of solution is preferred. Generally, however, and for the temperature ranges herein contemplated, when hydrolyzing such titanium sulfate solutions, acid concentrations ranging from substantially 2.0 to 6.0 gram-mols of $H_2SO_4$ per liter are effectively useful; while acid concentrations ranging from 0.5 to 5.5 gram-mols of HCl per liter of solution are desirable for use when hydrolyzing titanium chloride solutions.

Although use is preferred of an upper temperature limit of substantially 450° C., temperatures of a relatively higher order and up to substantially 550° C. may also be used, with a corresponding correlated pressure condition. In such instances, however, some loss in brightness may result, unless avoided by suitable adjustment of the time of treatment. Likewise, though the invention has been illustrated in connection with the precipitation and recovery of titanium oxide products per se, complex or extended types of pigments may be suitably obtained by effecting hydrolysis in the presence of various base materials or extenders such as various alkaline earth metal sulfates, particularly calcium or barium sulfate, or silicates; or the process may be conducted in such manner that co-precipitation of the $TiO_2$ pigment and extender or base material may be had, such as by effecting hydrolysis in the presence of soluble compounds adapted to yield through precipitation the extender or base materials mentioned.

As will be apparent, the invention affords the direct obtainment from the hydrolysis process of a product having fully developed pigment properties, which product prior to use need only be subjected to conventional washing and drying to remove water. As a consequence, there is desirably avoided the previously required calcination step to develop pigment properties. This is very advantageous, not only because of the fuel savings which thereby result, but there is eliminated the danger of sintering of pigment particles during calcination, whereby production of a more uniform particle size pigment is assured. Previously, it has been considered necessary to the development of commercially satisfactory pigment strengths to calcine the raw pigment at temperatures ranging from substantially 800 to 1050° C. At such temperatures, undesirable sintering of the particles usually occurs, so that the product obtained as a result of such calcination is relatively coarse and gritty and must therefore be subjected to prolonged grinding in an attempt to reduce to some extent the sintered aggregates. As noted, the instant invention affords the elimination of this objectionable calcination step and the direct production of a fully developed pigment product from the hydrolysis, which product is inherently soft and smooth in texture and free from sintered aggregates or other injurious effects arising by reason of high calcination temperatures.

Additional advantages afforded by the invention are that the products from the hydrolysis are easily filterable, whereas the products from hydrolysis of titanium salt solutions, particularly titanium chloride at atmospheric pressure, are often colloidal in nature and very difficult to filter.

I claim as my invention:

1. A process for producing an uncalcined, anhydrous titanium oxide product of substantially fully-developed pigment properties including tinting strength, comprising subjecting an aqueous relatively pure solution of a hydrolyzable titanium salt solution having an acid concentration of from .5 to 6.0 gram mols of acid per liter, to hydrolysis in a closed vessel while maintaining the same at a temperature ranging from 350 to 450° C. and under the pressure generated by said solution at the temperature employed, the heat and pressure treatment of said solution being conducted for a period of time sufficient to produce a substantial yield of anhydrous crystalline $TiO_2$ with substantially fully-developed pigment properties, and then purifying and recovering the resulting pigment grade product.

2. A process for producing an uncalcined, anhydrous titanium oxide product of substantially fully-developed pigment properties, including tinting strength, comprising subjecting a hydrolyzable relatively pure titanium sulfate solution containing from substantially 2.6 to 6.0 gram mols of $H_2SO_4$ per liter to hydrolysis in a closed vessel while maintaining the same at a temperature within the range of 350 to 450° C. and under the pressure generated by said solution at the temperature employed, the heat and pressure treatment of said solution being conducted for a period of time sufficient to produce a substantial yield of anhydrous crystalline $TiO_2$ with substantially fully-developed pigment properties, and then purifying and recovering the resulting pigment grade product.

3. A process for producing an uncalcined anhydrous titanium oxide product of substantially fully-developed pigment properties, including tinting strength, comprising subjecting a hydrolyzable titanium chloride solution containing about 1.0 to 4 gram mols of HCl per liter to hydrolysis in a closed reaction vessel while maintaining the same at a temperature within the range of 350 to 450° C. and under the pressure generated by said solution at the temperature employed, the heat and pressure treatment of said solution being conducted for a period of time sufficient to produce a substantial yield of anhydrous crystalline $TiO_2$ with substantially fully-developed pigment properties, and then purifying and recovering the resulting pigment grade product.

4. A process for obtaining a substantially fully-developed, anhydrous titanium oxide pigment directly from hydrolysis and without any calcination treatment, which comprises hydrolyzing in a closed reaction vessel a relatively pure, hydrolyzable titanium chloride solution having an acid concentration ranging from substantially 0.5 to 5.0 gram-mols of HCl per liter at a temperature ranging from substantially 350° C. to 450° C. and under the pressure generated by said solution at the temperature employed, conducting said hydrolysis for a period of time sufficient to produce a substantial yield of anhydrous crystalline $TiO_2$ with substantially fully-developed pigment properties and thereafter recovering, washing and